United States Patent
Layrisse et al.

(10) Patent No.: US 6,384,091 B2
(45) Date of Patent: *May 7, 2002

(54) EMULSION WITH COKE ADDITIVE IN HYDROCARBON PHASE AND PROCESS FOR PREPARING SAME

(75) Inventors: Ignacio A. Layrisse; Nilia Romero; Gustavo A. Nunez, all of Caracas (VE)

(73) Assignee: Intevep, S.A., Caracas (VE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,310

(22) Filed: Jul. 23, 1999

Related U.S. Application Data

(62) Division of application No. 09/057,879, filed on Apr. 9, 1998, now Pat. No. 6,069,178.

(51) Int. Cl.[7] .............................. C01L 1/10; C01L 1/32; C08L 95/00; C09D 195/00
(52) U.S. Cl. .............................. 516/50; 44/282; 44/301; 106/277
(58) Field of Search .............................. 516/50, 63, 64; 44/281, 301, 282; 106/277

(56) References Cited

U.S. PATENT DOCUMENTS

| 4,441,887 A | * | 4/1984 | Funk ........................... 44/281 |
| 4,801,304 A | * | 1/1989 | Polanco et al. ................ 44/301 |
| 5,283,001 A | * | 2/1994 | Gregoli et al. ................. 44/301 |
| 5,478,365 A | * | 12/1995 | Nikanjam et al. ............. 44/280 |
| 5,480,583 A | * | 1/1996 | Revis et al. ................... 44/301 |
| 5,902,359 A | * | 5/1999 | Grosso et al. ................. 44/281 |

* cited by examiner

Primary Examiner—Daniel S. Metzmaier
(74) Attorney, Agent, or Firm—Bachman & LaPointe, P.C.

(57) ABSTRACT

A process for preparing a hydrocarbon in water emulsion includes the steps of providing a hydrocarbon phase containing inactive natural surfactant; mixing a solid carbon additive with the hydrocarbon phase, the solid additive being selected from the group consisting of coal, coke and mixtures thereof so as to provide a hydrocarbon suspension including the solid carbon additive; and forming an emulsion from the hydrocarbon suspension and an aqueous phase in the presence of a surfactant activating additive so as to activate the inactive natural surfactant and form a hydrocarbon in water emulsion having the solid carbon additive suspended in the hydrocarbon phase. A hydrocarbon in water emulsion is also provided including a hydrocarbon phase, a water phase, a surfactant, and a solid carbon additive suspended in the hydrocarbon phase, the solid carbon additive being selected from the group consisting of coal, coke and mixtures thereof.

14 Claims, No Drawings

EMULSION WITH COKE ADDITIVE IN HYDROCARBON PHASE AND PROCESS FOR PREPARING SAME

This is a Division, of application Ser. No. 09/057,879, filed Apr. 9, 1998, now U.S. Pat. No. 6,069,178.

BACKGROUND OF THE INVENTION

The invention relates to a hydrocarbon in water emulsion and process for preparing same and, more particularly, to an emulsion and process including a solid carbon additive, especially coal or coke, which is useful in enhancing the energy potential of the emulsion as a fuel, and which also allows the emulsion to be used in paving procedures, while maintaining stability of the emulsion during transportation and storage.

Refineries on a worldwide basis produce large amounts of coke, the disposal of which can pose problems. This coke typically is present as a solid, further complicating the proper disposal of same.

The need exists for a technique or method which utilizes coke so as provide an advantageous disposition of same.

Bitumen emulsions are typically used as a source of combustible fuel. One problem frequently encountered with such fuel is that the sulfur content of the bitumen poses problems.

The need also remains for a bitumen emulsion wherein a reduced sulfur content is provided per unit of energy produced.

It is therefore the primary object of the present invention to provide a method for incorporating coke into an emulsion for use as a combustible fuel and/or in paving procedures.

It is a further object of the present invention to provide a method for incorporating solid carbon additives such as coal or coke into a bitumen in water emulsion so as to provide a material useful as a combustible fuel having a reduced sulfur content per unit of energy produced or as a paving material.

Other objects and advantages of the present invention will appear hereinbelow.

SUMMARY OF THE INVENTION

In accordance with the present invention, the foregoing objects and advantages are readily attained.

According to the invention, a process for preparing a hydrocarbon in water emulsion is provided, which process comprises the steps of: providing a hydrocarbon phase; mixing a solid carbon additive with said hydrocarbon phase, said solid carbon additive being selected from the group consisting of coal, coke and mixtures thereof so as to provide a hydrocarbon suspension including said solid additive; and forming an emulsion from said hydrocarbon suspension and an aqueous phase in the presence of a surfactant so as to form a hydrocarbon in water emulsion having said solid additive suspended in said hydrocarbon phase.

In further accordance with the present invention, a hydrocarbon in water emulsion is provided which is extremely useful as a combustible fuel or as a paving material, which emulsion comprises a hydrocarbon phase, a water phase, a surfactant, and a solid carbon additive suspended in the hydrocarbon phase, said solid carbon additive being selected from the group consisting of coal, coke and mixtures thereof.

DETAILED DESCRIPTION OF THE PREFERRED EMBODIMENTS

The invention relates to a hydrocarbon in water emulsion and process for preparing same, and particularly to a viscous hydrocarbon or bitumen in water emulsion, wherein the bitumen is provided with a solid carbon additive suspended therein which renders the emulsion useful as a paving material and also as a combustible fuel, and which further serves to provide an emulsion having excellent stability at a reasonable cost.

The hydrocarbon phase of the emulsion and process of the present invention may suitably be any hydrocarbon, especially viscous hydrocarbon, from which it is desirable to form emulsions in water so as to enhance the transportability thereof. Emulsions of viscous hydrocarbon in water are useful as a combustible fuel and, according to the invention, as paving materials for use in paving roads and the like.

Most naturally occurring viscous hydrocarbon material contains inactive surfactants including carboxylic acids, phenols and esters which, under proper conditions, can be activated as surfactants.

These inactive natural surfactants can be activated and stabilized using additives. The use of amine additives to activate the inactive natural surfactants is disclosed in U.S. Pat. No. 5,480,583 to Rivas et al.

The incorporation of additional components into emulsions can very frequently have a destabilizing or other adverse effect on the resulting emulsion. In accordance with the present invention, however, it has been found that by using amine additives to activate the natural surfactants contained in the heavy hydrocarbon phase, a stable emulsion including the solid carbon additive incorporated into the hydrocarbon phase can be provided.

According to the invention, the solid carbon additive to be used may suitably be a particulate coke additive, which provides an emulsion which is well suited for use in paving operations, or a particulate coal additive which can be used to maintain the energy levels produced by combustion of the emulsion, while potentially reducing the overall sulfur content of the emulsion as desired through the use of lower sulfur coal, which is particularly advantageous in light of desired or required emission levels of combustion processes.

The solid carbon additive, either coal or coke, may typically be obtained having a solid structure of widely diverse particle size. In accordance with the present invention, this solid is preferably treated, for example using milling and the like, to reduce the particle size of the solid carbon additive, preferably to a size less than or equal to about 30 microns. This may be carried out, for example, using a vibratory cryogenic mill such as the 6700 Freezer Mill of SPEX Industries. Of course, if the starting material is obtained already having the desired particle size, no additional milling is needed.

The hydrocarbon phase is preferably a viscous hydrocarbon having an API gravity of less than or equal to about 16, preferably less than or equal to about 8.1, and a viscosity at 120° F. of greater than or equal to about 100 cp. A specific example of a suitable hydrocarbon for use in accordance with the present invention is Cerro Negro bitumen, which may typically have the following composition.

| TYPICAL CERRO NEGRO BITUMEN | |
|---|---|
| Gravity API 60° C. | 8.1 |
| Saturates % (wt.) | 29.4 |
| Aromatics % | 35.6 |
| Resins % | 18.9 |
| Asphaltenes % | 16.1 |

-continued

TYPICAL CERRO NEGRO BITUMEN

| | |
|---|---|
| Acidity (mg KOH/g) | 3.02 |
| Carbon % | 80.3 |
| Hydrogen % | 9.9 |
| Nitrogen (ppm) | 6188 |
| Sulfur % | 3.7 |
| Vanadium (ppm) | 367.4 |
| Nickel (ppm) | 95.5 |
| Sodium (ppm) | 11.8 |
| Conradson Carbon % | 17.2 |
| Water % | 0.1 |

The water or aqueous phase of the emulsion may suitably be water from any convenient source, and preferably includes the amine additive for activating the natural surfactant of the bitumen. Suitable amine additives include combinations of amines and sodium hydroxide (NaOH) as described in U.S. Pat. No. 5,480,583.

The aqueous phase of the emulsion is preferably provided containing the amine additive in an amount corresponding to between about 800 ppm and about 2500 ppm wt. with respect to the bitumen.

In accordance with the present invention, it has also been found that the mixing of a solid carbon additive with the hydrocarbon phase, wherein the solid additive is mixed in a specific ratio to the hydrocarbon phase, and is present at desired particle sizes or diameters, serves to enhance the stability of the emulsion while also enhancing the combustion and/or paving characteristics of the emulsion. Solid carbon additives in accordance with the present invention are preferably oil insoluble, and may include coal, coke resulting from bituminous coal or petroleum processes and the like, and mixtures thereof.

In accordance with the present invention, the solid carbon additive is preferably provided having an average particle size less than or equal to about the mean droplet size of the hydrocarbon phase in the final emulsion such that the solid particles remain suspended within hydrocarbon droplets as desired. In this regard, the solid carbon additive of the present invention is preferably provided having an average particle size less than a mean volume diameter ($D_{(4,3)}$) of the hydrocarbon, wherein the mean volume diameter is defined as follows:

$$D_{(4,3)} = (\Sigma di^4/vi)/(\Sigma di^3/vi),$$

wherein di is the mean diameter of band "i" of a histogram of the emulsion, and vi is the accumulated volume of droplets in that particular band. The solid additive in accordance with the present invention is preferably provided having an average particle size of less than or equal to about 30 microns, most preferably less than or equal to about 15 microns.

The solid additive is preferably also mixed with hydrocarbon in accordance with the present invention in amounts which are less than or equal to about 10% wt. of the hydrocarbon, or 800 ppm based on total emulsion, so as to further reduce the possibility for sedimentation of the solid additive. In this regard, it has been found that solid additive may suitably be mixed with the hydrocarbon according to the following relation $$\Phi_S/(\Phi_H+\Phi_S) \leq K,$$

wherein $\Phi_S$ is the volume fraction of the solid additive, $\Phi_H$ is the volume fraction of the hydrocarbon, and K is 0.1.

In order to insure the internal dispersion of solid additive through the hydrocarbon or bitumen phase, the bitumen may preferably be heated to a temperature sufficient to allow substantially homogeneous mixture. For example, Cerro Negro bitumen may suitably be heated to a temperature of at least about 60° C. or higher prior to mixing with the solid additive.

The emulsion of the present invention may preferably be prepared as follows. Initially, the viscous hydrocarbon phase is provided. The desired solid additive in accordance with the present invention is also provided, and may need to be milled or otherwise treated so as to provide a suitable average particle size.

The solid particles are then mixed with the hydrocarbon phase, preferably heated as discussed above, so as to allow the internal dispersion of the solid within the hydrocarbon. This suspension of solid particles in hydrocarbon is then used to form a hydrocarbon in water emulsion by mixing with an aqueous phase as discussed above, and subjecting the mixture to sufficient mixing energy so as to provide an oil-in-water emulsion preferably having an average droplet size of the hydrocarbon phase of between about 1 $\mu$m and about 30 $\mu$m, and having a ratio by volume of hydrocarbon/water of between about 85/15 and about 70/30. Most preferably, in accordance with the present invention, the emulsion may be formed by mixing the hydrocarbon/solid suspension with a portion of the aqueous phase so as to provide an 85/15 emulsion, and subsequently diluting the emulsion to a desired 70/30 ratio.

The solid carbon particles, either coke or coal, are preferably dispersed in the bitumen in a blending process which may be carried out for a time preferably between about 1 and about 10 minutes, more preferably between about 2 and about 4 minutes and at a temperature of between about 50° C. and about 90° C., more preferably between about 65° C. and about 75° C. The solid carbon particles and bitumen are preferably blended at a ratio by weight of bitumen to particles of between about 1:1 and 25:1.

Once the solid carbon additive has been provided having the desired particle size, and in the proper amounts based upon the bitumen, the final emulsion is formed using bitumen with suspended solid and a water phase which may preferably be provided with the additive, for example containing about 2000 mg/l of monoethanolamine and, preferably, having a sodium concentration equivalent to about 20 mg/l of Na+ ions in the final emulsion. As set forth above, the monoethanolamine and NaOH serve to activate natural surfactant present in the bitumen and to provide a final emulsion product having suitable stability.

During the mixing stage, the bitumen is preferably maintained at a temperature of about 60° C., and the water with amine/NaOH additive is mixed in a mixer preferably during a pre-mixing stage at 200 rpm for about 2 minutes, followed by mixing at 1500 rpm for an additional 2 minutes so as to provide a stable emulsion. At this stage, the bitumen with solid and water are preferably mixed so as to provide an emulsion having a ratio by volume of bitumen to water of between about 80/20 and about 90/10, preferably about 85/15. This intermediate emulsion is then diluted using additional water, preferably to a final emulsion having a bitumen/water ratio of about 70/30. The dilution may suitably be carried out while mixing for a period of about 1 minute, preferably at about 1000 rpm.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A hydrocarbon in water emulsion comprising a hydrocarbon phase wherein said hydrocarbon phase is a viscous hydrocarbon having an API gravity of less than or equal to about 16, and a viscosity at 122° F. of greater than or equal to about 100 cp; a water phase; and a sole surfactant consisting of a natural surfactant derived from said hydrocarbon phase containing the natural surfactant, said natural surfactant having carboxylic acids, phenols, esters and mixtures thereof in inactive form and a natural surfactant activating agent consisting of an amine additive, optionally with NaOH; and a solid carbon additive suspended in the hydrocarbon phase, said solid carbon additive being selected from the group consisting of coal, coke and mixtures thereof and being present in a ratio by weight of hydrocarbon to solid carbon additive of between about 1:1 to 25.1.

2. An emulsion according to claim 1, wherein said hydrocarbon is Cerro Negro bitumen.

3. An emulsion according to claim 1, wherein said solid carbon additive is coke.

4. An emulsion according to claim 1, wherein said solid carbon additive is coal.

5. An emulsion according to claim 1, wherein said solid carbon additive has an average particle size of less than or equal to about a mean droplet size of said hydrocarbon phase in said emulsion.

6. An emulsion according to claim 1, wherein said solid carbon additive has an average particle size which is less than a mean volume diameter $D_{(4,3)}$ of said hydrocarbon, which is defined as follows:

$$D_{(4,3)} = (\Sigma di^4/vi)/(\Sigma di^3/vi),$$

wherein di is mean diameter of band I of a histogram of said emulsion, and vi is accumulated volume of droplets in said band.

7. An emulsion according to claim 1, wherein said solid carbon additive has an average particle size of less than or equal to about 30 $\mu$m.

8. An emulsion according to claim 1, wherein said solid carbon additive has an average particle size of less than or equal to about 15 $\mu$m.

9. An emulsion according to claim 1, wherein said solid carbon additive is present in said emulsion in an amount less than or equal to about 10% wt. of said hydrocarbon.

10. An emulsion according to claim 1, wherein said solid carbon additive is present in said emulsion according to the following:

$$\Phi_S/(\Phi_H + \Phi_S) \leq K,$$

wherein $\Phi_S$ is volume fraction of said solid carbon additive, $\Phi_H$ is volume fraction of said hydrocarbon, and K is 0.1.

11. An emulsion according to claim 1, wherein said hydrocarbon phase and said water phase are present at a ratio by volume of hydrocarbon/water between about 70/30 and about 85/15.

12. An emulsion according to claim 1, wherein said hydrocarbon phase has an average droplet diameter of between about 1 $\mu$m and about 30 $\mu$m.

13. An emulsion according to claim 1, wherein said surfactant activating agent consisting of an amine and sodium hydroxide in amounts effective for activating said natural surfactant to stabilize the emulsion.

14. An emulsion according to claim 13, wherein said emulsion contains said amine in an amount between about 800 ppm and about 2500 ppm based on weight of said hydrocarbon phase.

* * * * *